US006801758B2

(12) United States Patent
Nagata

(10) Patent No.: US 6,801,758 B2
(45) Date of Patent: Oct. 5, 2004

(54) METHOD AND SYSTEM FOR SELECTING A DIVERSITY BRANCH ACCORDING TO INTRA-CELL AND INTER-CELL HANDOVER COMBINING SCHEMES

(75) Inventor: Yoshinori Nagata, Tokyo (JP)

(73) Assignee: NEC Corporation, Tokyo (JP)

( * ) Notice: Subject to any disclaimer, the term of this patent is extended or adjusted under 35 U.S.C. 154(b) by 488 days.

(21) Appl. No.: 10/012,502

(22) Filed: Dec. 12, 2001

(65) Prior Publication Data

US 2002/0090948 A1 Jul. 11, 2002

(30) Foreign Application Priority Data

Dec. 12, 2000 (JP) ........................................ 2000-377681

(51) Int. Cl.[7] .............................. H04B 1/00; H04B 7/00
(52) U.S. Cl. ....................... 455/101; 437/424; 437/561; 437/444; 375/347; 370/320
(58) Field of Search ................................ 455/436, 437, 455/438–439, 440–441, 442, 443, 444, 445, 446, 450–453, 422.1–425, 513, 514, 515, 67.11, 101, 73, 78, 70, 560–562.1; 370/335, 350, 342; 375/144, 148, 267, 347, 299

(56) References Cited

U.S. PATENT DOCUMENTS 5,663,990 A * 9/1997 Bolgiano et al. ........... 375/141
5,742,911 A     4/1998 Dumbrill et al.
5,933,787 A     8/1999 Gilhousen et al.
5,960,330 A * 9/1999 Azuma ........................ 455/101
6,069,912 A * 5/2000 Sawahashi et al. ......... 375/347
6,154,653 A    11/2000 Jung
6,212,368 B1 * 4/2001 Ramesh et al. .......... 455/277.2
6,366,568 B1 * 4/2002 Bolgiano et al. ............ 370/335
6,515,978 B1 * 2/2003 Buehrer et al. ............. 370/342
6,529,746 B1 * 3/2003 Kotzin ..................... 455/562.1

FOREIGN PATENT DOCUMENTS

GB    2 328 589 A    2/1999

* cited by examiner

*Primary Examiner*—Erika Gary
*Assistant Examiner*—Kamran Afshar
(74) *Attorney, Agent, or Firm*—Sughrue Mion, PLLC

(57) ABSTRACT

Diversity gains indicating an amount to be gained when maximal ratio combining is performed on intra-cell diversity branches are stored in a first memory, and diversity gains indicating an amount to be gained when selective combining is performed on inter-cell diversity branches are stored in a second memory. A list of pilot signals sent from a mobile station is received and examined. If the diversity branch of a pilot signal is an intra-cell diversity branch, a diversity gain is read from the first memory and summed with the power level of the pilot signal. If the diversity branch of a pilot signal is the inter-cell diversity branch, a diversity gain is read from the second memory and summed with the power level of the pilot signal. One of the diversity branches corresponding to the highest of the sums is selected and the mobile station is informed of the selected branch.

32 Claims, 7 Drawing Sheets

FIG. 2A
SELECTIVE DIVERSITY COMBINING
| IMPROVEMENT VALUE K(i) | DIFFERENCES D(i) BETWEEN CURRENT AND CANDIDATE BRANCHES | POWER LEVEL P(c) OF CURRENT DIVERSITY BRANCH |
|---|---|---|
|  |  |  |
| ⋮ | ⋮ | ⋮ |
|  |  |  |
|  |  |  |
FIG. 2B
MAXIMAL RATIO DIVERSITY COMBINING
| IMPROVEMENT VALUE K(i) | DIFFERENCES D(i) BETWEEN CURRENT AND CANDIDATE BRANCHES | POWER LEVEL P(c) OF CURRENT DIVERSITY BRANCH |
|---|---|---|
|  |  |  |
| ⋮ | ⋮ | ⋮ |
|  |  |  |
|  |  |  |
FIG. 3A
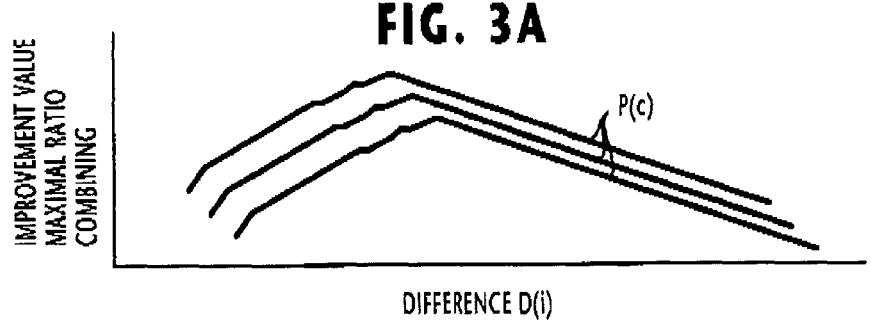
FIG. 3B
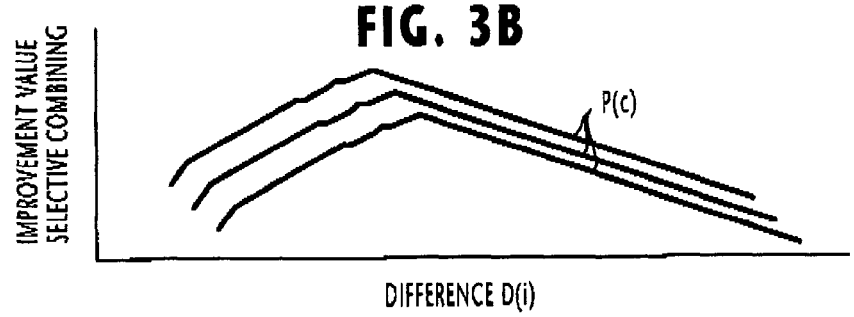

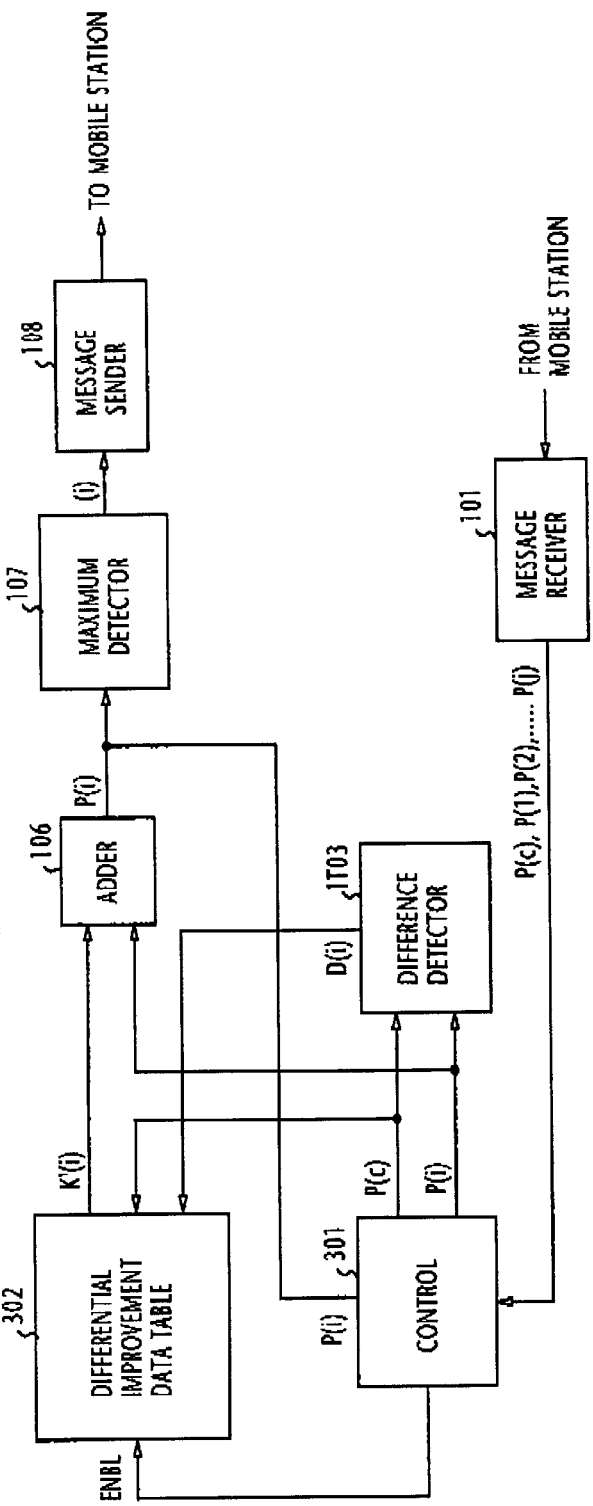

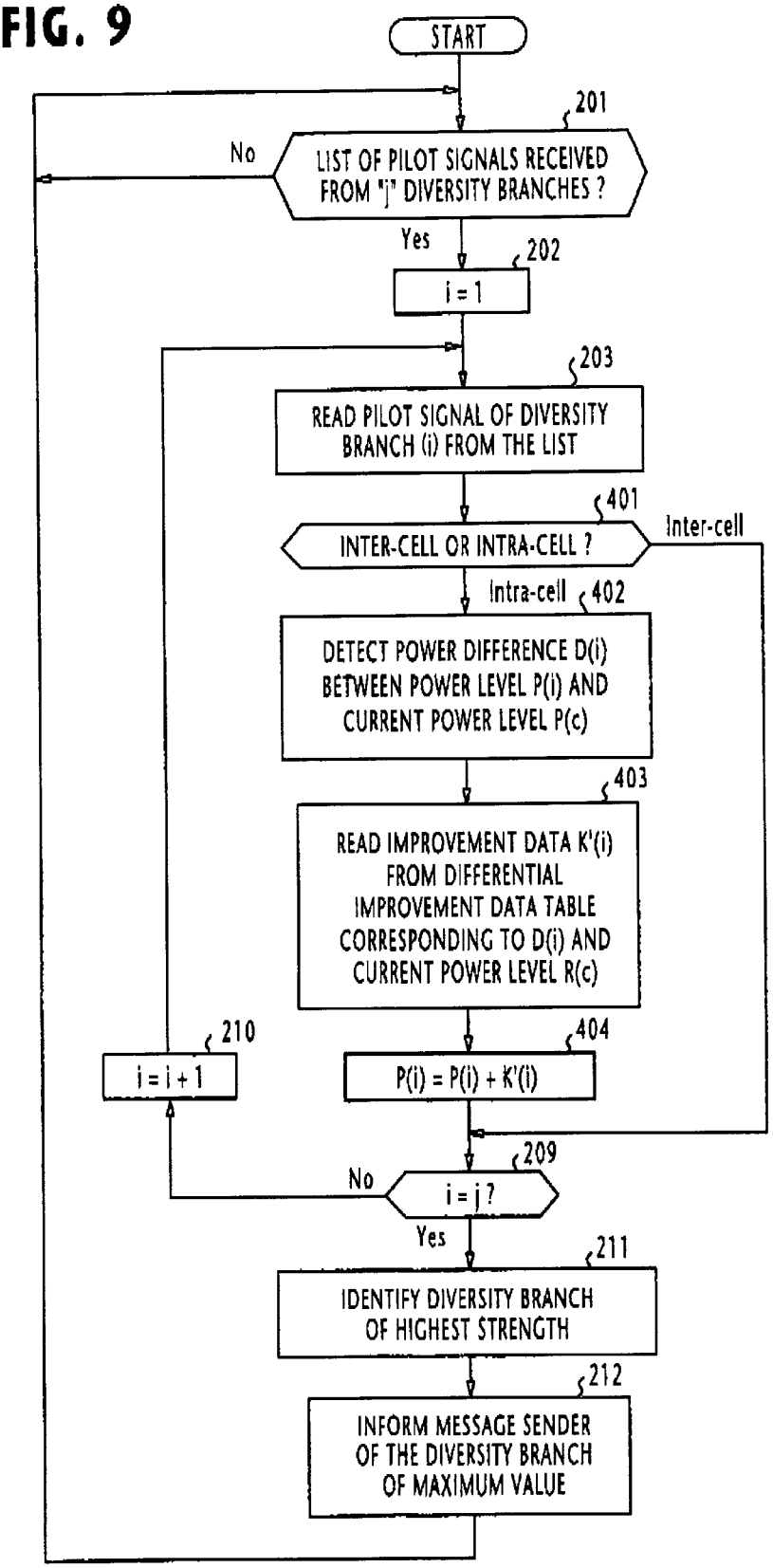

METHOD AND SYSTEM FOR SELECTING A DIVERSITY BRANCH ACCORDING TO INTRA-CELL AND INTER-CELL HANDOVER COMBINING SCHEMES

BACKGROUND OF THE INVENTION

1. Field of the Invention

The present invention relates generally to CDMA mobile communication systems, and more specifically to a diversity branch selecting method and system for a base station using a list of field intensity levels detected and sent from a mobile station. The present invention is particularly useful for diversity handover known as micro-diversity.

2. Description of the Related Art

In a CDMA mobile communication network, when a mobile station encounters a low signal quality on the current communication path (known as a primary diversity branch), it begins a search through a number of diversity branches to surrounding cell-sites or a number of sector-antenna elements for pilot signals and sends a report to the current cell-site on their power levels to request it to determine a second diversity branch in preparation for a possible inter-cell diversity handover or a possible intra-cell diversity handover.

According to the prior art, diversity branch signals are maximal-ratio combined in the case of an intra-cell diversity handover, while they are selectively combined on a frame-by-frame basis in the case of an inter-cell diversity handover. As a result of the different combining schemes, the diversity branch selected by the prior art is found to be not necessarily the best at all times. If the power levels of two pilot signals on uplink diversity branches are equal to each other, the maximal ratio combining of these signals produces an improvement of about 3 dB, while the improvement obtained by the frame-by-frame selective combining is as low as 1 dB. In so far as the quality of uplink signals is concerned, the difference of 2 dB is of a significant value. Therefore, if there is a difference of 1 dB between two pilot signals and one of these having lower quality is arriving from an intra-cell diversity branch (i.e., another sector of the same cell-site), the maximal-ratio combining of this signal with the current signal would produce an improvement greater than would be obtained by the frame-by-frame selective combining of the higher quality signal.

SUMMARY OF THE INVENTION

It is therefore an object of the present invention to provide a method and system for selecting a diversity branch that is optimum for both intra-cell maximal ratio diversity combining and inter-cell selective diversity combining.

According to a first aspect of the present invention, there is provided a method of selecting a diversity branch from a list of pilot signals detected by and sent from a mobile station and informing the mobile station of identity of the selected diversity branch as an additional diversity branch, the pilot signals indicating their power levels and identities of diversity branches through which the pilot signals are respectively transmitted to the mobile station, the method comprising the steps of (a) storing diversity gain data in a first memory which indicates an amount to be gained when maximal ratio combining is performed on signals from intra-cell diversity branches and storing diversity gain data in a second memory which indicates an amount to be gained when selective combining is performed on signals from inter-cell diversity branches, b) determining whether the diversity branch of each pilot signal of the list is an intra-cell diversity branch or an inter-cell diversity branch, (c) if the diversity branch of each pilot signal is the intra-cell diversity branch, reading a diversity gain from the first memory and summing the read gain with the power level of each pilot signal, (d) if the diversity branch of each pilot signal is the inter-cell diversity branch, reading a diversity gain from the second memory and summing the read gain with the power level of each pilot signal, and (e) selecting one of the diversity branches of the list corresponding to the highest of sums obtained by steps (c) and (d).

According to a second aspect, the present invention provides a method of selecting a diversity branch from a list of pilot signals detected by and sent from a mobile station and informing the mobile station of identity of the selected diversity branch as an additional diversity branch, the pilot signals indicating their power levels and identities of diversity branches through which the pilot signals are transmitted respectively to the mobile station, the method comprising the steps of (a) storing diversity gain data in a memory which indicates a difference between an amount to be gained when maximal ratio combing is performed on signals from intra-cell diversity branches and an amount to be gained when selective combining is performed on signals from inter-cell diversity branches, (b) determining whether the diversity branch of each pilot signal of the list is a predetermined one of an intra-cell diversity branch and an inter-cell diversity branch, (c) if the diversity branch of each pilot signal is the predetermined one, reading a diversity gain from the first memory and combining the read gain with the power level of each pilot signal to produce a sum, (d) if the diversity branch of each pilot signal is other than the predetermined one, identifying the power level of each pilot signal as a non-sum, and (e) selecting one of the diversity branches of the list corresponding to the highest of at least one sum produced by step (c) and at least one non-sum identified by step (d).

According to a third aspect, the present invention provides a system for selecting a diversity branch from a list of pilot signals detected by and sent from a mobile station and informing the mobile station of identity of the selected diversity branch as an additional diversity branch, the detected pilot signals indicating their power levels and identities of diversity branches through which the pilot signals are respectively transmitted to the mobile station. The system comprises a first memory for storing diversity gain data which indicates an amount to be gained when maximal ratio combining is performed on signals from intra-cell diversity branches, a second memory for storing diversity gain data which indicates an amount to be gained when selective combining is performed on signals from inter-cell diversity branches, and control means. The control means determines whether the diversity branch of each of the pilot signals is an intra-cell diversity branch or an inter-cell diversity branch, and reads a diversity gain from the first memory and summing the read gain with the power level of each pilot signal if the diversity branch is determined to be the intra-cell diversity branch, or reads a diversity gain from the second memory and summing the read gain with the power level of each pilot signal if the diversity branch is determined to be the inter-cell diversity branch, whereby a plurality of summed values are produced. The control means selects one of the diversity branches of the list corresponding to the highest of the summed values.

According to a fourth aspect, the present invention provides a system for selecting a diversity branch from a list of pilot signals detected by and sent from a mobile station and informing the mobile station of identity of the selected diversity branch as an additional diversity branch, the detected pilot signals indicating their power levels and identities of diversity branches through which the pilot signals are respectively transmitted to the mobile station. The system comprises a memory for storing diversity gain data which indicates a difference between an amount to be gained when maximal ratio combining is performed on signals from intra-cell diversity branches and an amount to be gained when selective combining is performed on signals from inter-cell diversity branches. Control means determines whether the diversity branch of each of the pilot signals is a predetermined one of an intra-cell diversity branch and an inter-cell diversity branch, reads a diversity gain from the memory, summing the read gain with the power level of each pilot signal if the diversity branch of the pilot signal is determined to be the predetermined one to produce a sum, identifies the power level of each pilot signal as a non-summed power level if the diversity branch of the pilot signal is determined to be other than the predetermined one, and selects one of the diversity branches of the list corresponding to the highest of a plurality of the summed power level and a plurality of the non-summed power level.

According to a fifth aspect of the present invention, there is provide a computer readable storage medium for a system including a first memory storing diversity gain data which indicates an amount to be gained when maximal ratio combining is performed on signals from intra-cell diversity branches and a second memory storing diversity gain data which indicates an amount to be gained when selective combining is performed on signals from intra-cell diversity branches, the storage medium storing instructions data which comprises the steps of (a) receiving a list of pilot signals detected by and sent from a mobile station, the pilot signals indicating their power levels and their diversity branches, (b) determining whether the diversity branch of each pilot signal of the list is an intra-cell diversity branch or an inter-cell diversity branch, (c) if the diversity branch of each pilot signal is the intra-cell diversity branch, reading a diversity gain from the first memory and summing the read gain with the power level of each pilot signal, (d) if the diversity branch of each pilot signal is the inter-cell diversity branch reading a diversity gain from the second memory and summing the read gain with the power level of each pilot signal, (e) repeating steps (b) to (d) until a plurality of summed values are produced from all pilot signals of the list, and (f) selecting one of the diversity branches indicated in the list having a highest value of the summed values.

According to a sixth aspect, the present invention provides a computer readable storage medium for a system including a memory storing diversity gain data which indicates a difference between an amount to be gained when maximal ratio combining is performed on signals from intra-cell diversity branches and an amount to be gained when selective combining is performed on signals from inter-cell diversity branches, the storage medium storing instructions data which comprises the steps of (a) receiving a list of pilot signals detected by and sent from a mobile station, the pilot signals indicating their power levels and their diversity branches through which the pilot signals are detected, (b) reading a diversity gain from the memory corresponding to a pilot signal of the list and summing the read gain with the power level of the pilot signal if the diversity branch of the pilot signal is a predetermined one of the intra-cell and inter-cell diversity branches and identifying the power level of the pilot signal as a non-sum if the diversity branch of the pilot signal is other than the predetermined one, (c) repeating step (b) on all pilot signals of the list to produce at least one sum and at least one non-sum, and (d) selecting one of the diversity branches of the list corresponding to the highest of sums and non-sums produced by step (c).

BRIEF DESCRIPTION OF THE DRAWINGS

The present invention will be described in detail further with reference to the following drawings, in which:

FIG. 2A is an illustration of a table for storing diversity gains to be used when selective diversity combining is performed;

FIG. 2B is an illustration of a table for storing diversity gains to be used when maximal ratio diversity combining is performed;

FIGS. 3A and 3B are graphic representations of diversity gains stored in the tables of FIGS. 2A and 2B, respectively;

FIG. 6 is a block diagram of diversity handover processing circuitry of a CDMA base station according to a second embodiment of the present invention;

FIG. 7 is an illustration of a table for storing differential diversity gains;

FIG. 9 is a flowchart of the operation of the control processor of FIG. 8.

DETAILED DESCRIPTION

Figure 1:
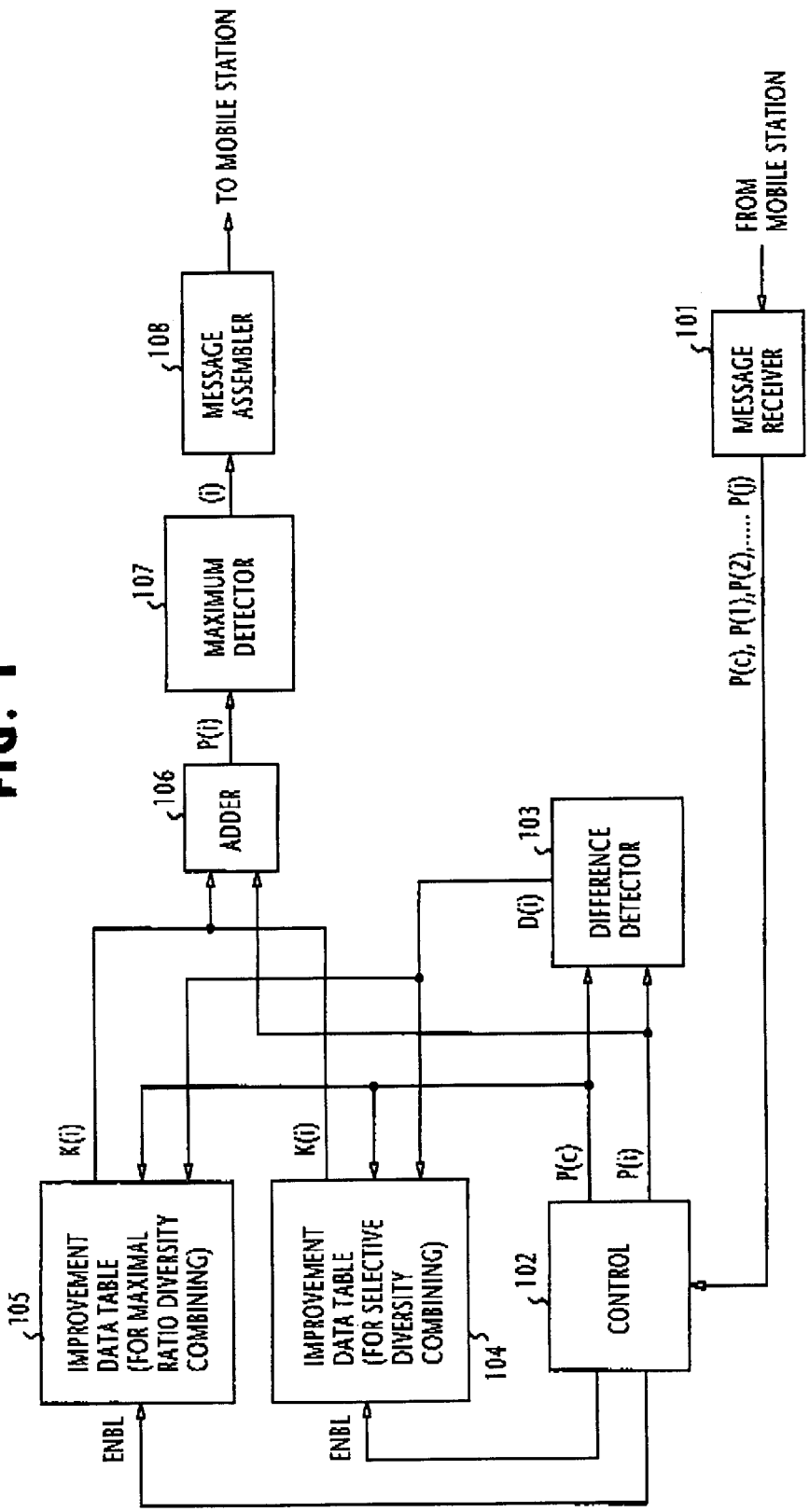
FIG. 1 is a block diagram of diversity handover processing circuitry of a CDMA base station according to a first embodiment of the present invention.

In FIG. 1, a diversity branch selection system of a first embodiment of the present invention is shown as forming part of the controller of a base station of a CDMA mobile network. Being irrelevant to the present invention, the wireless section of the base station is omitted for simplicity. The system may be realized either in hardware or software implementation. As a hardware implementation, the system is composed of a message receiver 101 which receives report messages from mobile stations.

When a mobile station encounters a drop in signal quality during communication with a current cell-site, it scans across the spectrum for pilot signals sent from surrounding cell-sites as well as other sectors of the current cell-site and receives these pilot signals via respective communication paths, or diversity branches and measures their power levels. The mobile station also receives a pilot signal from the current cell-site via a path called a primary (current) diversity branch and then prepares a list of such pilot signals. Each pilot signal of the list indicates its power level and the identity of its diversity branch. Thus, the list contains data indicating the power levels $P(i)$ of candidate diversity branches (where i identifies diversity branches and equals 1, 2, . . . , j) and the power level $P(c)$ of the current diversity branch. The mobile station formulates a report message with the list of pilot signals and transmits it to the current cell-site.

The power level data $P(c)$, $P(1)$, . . . , $P(j)$ of the mobile station are supplied from the message receiver 101 to a control processor 102, which sequentially performs processing on each of the power level data P(1) through P(j). Control processor 102 sequentially supplies power level data P(i) to a difference detector 103 for comparison with the current power level P(c) to sequentially produce differential data indicating amounts D(i) by which the candidate diversity branches respectively differ from the current power level.

Then, the processor 102 determines whether each candidate diversity branch is an intra-cell diversity branch or an inter-cell diversity branch. If the identity of a diversity branch indicates that its pilot signal has been transmitted from a surrounding cell-site, the processor has determined that the diversity branch is an inter-cell diversity branch and enables an improvement data table 104. Otherwise, this pilot signal has been transmitted from the current cell-site, and the processor has determined that the candidate diversity branch is an intra-cell diversity branch and enables an improvement data table 105.

Details of improvement data tables 104 and 105 are shown in FIGS. 2A and 2B, respectively. Table 104 provides a mapping of a plurality of quality improvement values K(i) that can be obtained by selective combining to a plurality of corresponding differences D(i) and a plurality of current power levels P(c). As shown in FIG. 3A, the quality improvement values of selective diversity combining may be obtained from their nonlinear relationship with difference values D(i) for each of a plurality of current power levels P(c).

In a similar manner, the table 105 provides a mapping of a plurality of quality improvement values K(i) that can be obtained when maximal ratio combining is performed to a plurality of corresponding differences D(i) and a plurality of current power levels P(c). As shown in FIG. 3B, the quality improvement values of maximal ratio diversity combining may be obtained from their nonlinear relationship with difference values D(i) for each of a plurality of current power levels P(c).

The quality improvement value of tables 104 and 105, which is uniquely identified by a pair of parameters D(i) and P(c), may be represented by a diversity gain that is obtained when the cell-site switches from a non-diversity mode to a diversity mode.

Therefore, a quality improvement value K(i) is read in response to D(i) and P(c) from one of the improvement data tables 104 and 105 depending on whether the candidate diversity branch is an inter-cell or intra-cell diversity branch.

For each candidate diversity branch, the power level P(i) is updated in an adder 106 by summing it with the corresponding improvement value K(i). A plurality of updated power level data P(i) are therefore produced. These updated power level data are fed to a maximum detector 107. Maximum detector 107 searches through the updated power values and selects the highest value and produces a signal identifying the diversity branch of the highest updated power level.

Therefore, if uplink signals transmitted from the mobile station via the current diversity branch and the selected diversity branches are combined in the cell-site according to the combining scheme determined previously by the processor 102, the diversity gain obtained in this way will be the best under this particular condition.

A message sender 108, connected to the output of maximum detector 107, formulates and transmits a report message indicating the selected diversity branch to the mobile station. In response, the mobile station establishes a communication channel through the selected diversity branch in addition to the current channel through the primary diversity branch. Upon reception, the cell-site combines the signals received via these two channels according to a maximal ratio or a selective combining scheme previously determined for the mobile station.

Figure 4:
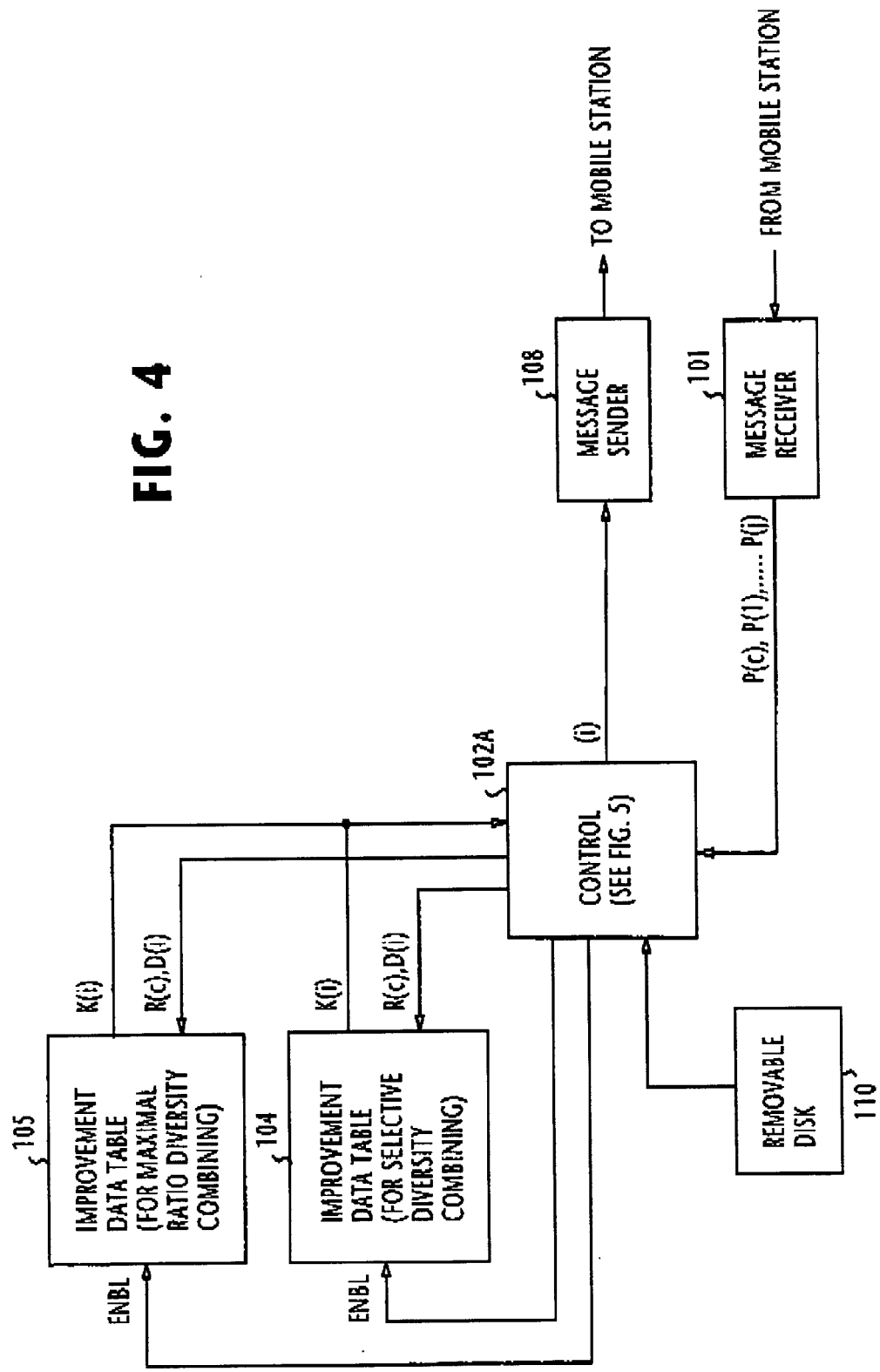
FIG. 4 is a block diagram of modified diversity handover processing circuitry of the first embodiment of the present invention.

In a software implementation, the diversity branch selection system of the first embodiment can be modified as shown in FIG. 4, in which the control processor 102A operates according to programmed instruction data supplied from a computer-readable storage medium such as a removable disk 110. Difference detector 103, the adder 106 and the maximum detector 107 of FIG. 1 and other control functions are software-implemented in the processor 102A as indicated by a flowchart shown in FIG. 5.

Figure 5:
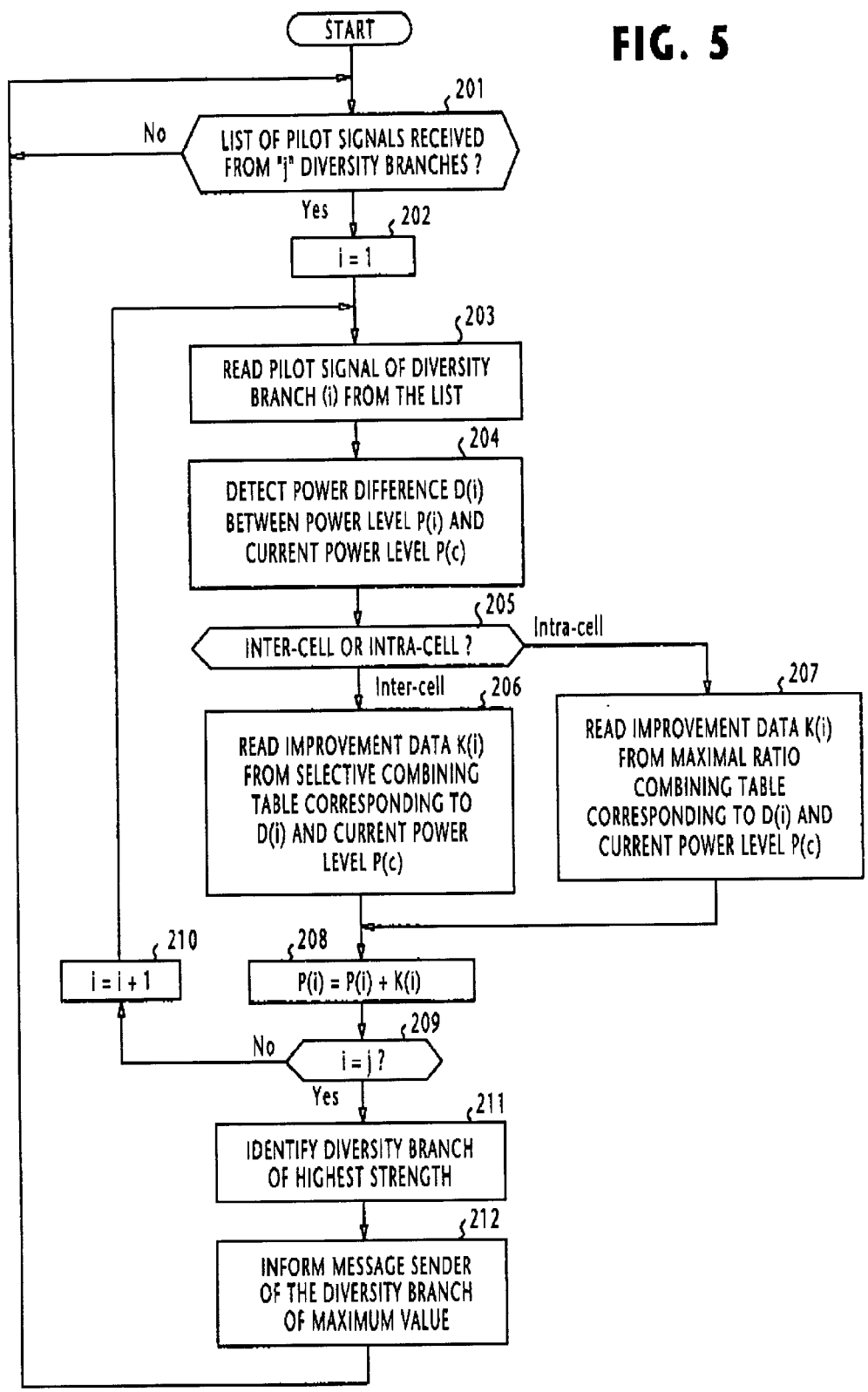
FIG. 5 is a flowchart of the operation of the control processor of FIG. 4.

In FIG. 5, the programmed routine begins with decision step 201 where the processor checks to see if a list of pilot signals from "j" diversity branches is received from a mobile station via the message receiver 101. If the decision is affirmative, flow proceeds to step 202 to set a variable "i" equal to 1 and reads the pilot signal of corresponding diversity branch (i) from the list (step 203) and compares its power level P(i) with the current power level P(c) and detects the difference D(i) (step 204). At step 205, the processor 102 determines whether the diversity branch (i) is an inter-cell diversity branch or an intra-cell diversity branch. If the processor has identified that the diversity branch (i) is an inter-cell diversity branch, it recognizes that the selective combining scheme is optimal and flow proceeds to step 206 to read quality improvement data K(i) from the table 104 by using the difference D(i) and the current power level P(c). If the processor has identified that the diversity branch (i) is an intra-cell diversity branch, it recognizes that the maximal ratio combining scheme is optimal and flow proceeds from step 205 to step 207 to read quality improvement data K(i) from the table 105 using the difference D(i) and the current power level P(c).

Following the execution of step 206 or 207, the power level value P(i) is updated by summing it with the read improvement value K(i) at step 208.

At decision step 209, the processor checks to see if the updated power levels P(i) have been determined for all candidate diversity branches. If the decision is negative, flow proceeds to step 210 to increment the variable "i" by one and returns to step 203 to repeat the above process. When the decision at step 209 is affirmative, flow quits the loop and advances to step 211 to identify the diversity branch having the highest of the updated power levels P(i) and informs the mobile station of the identified diversity branch (step 212) via the message sender 108, and returns to the starting point of the routine.

In a second embodiment of the present invention shown in FIG. 6, the improvement data tables 104 and 105 of FIG. 1 are implemented with a single table 302 by differentiating the improvement values of tables 104 and 105 and mapping the differences in the table 302 to the parameters D(i) and P(c), as shown in FIG. 7.

The second embodiment is generally similar to that of FIG. 1. In FIG. 6 parts corresponding to those in FIG. 1 are marked with the same reference numerals, the description thereof being omitted for simplicity. When the processor 301 receives a list of pilot signals from the message receiver 101, it determines whether the candidate diversity branch is an intra-cell or an inter-cell diversity branch. If the candidate diversity branch is an intra-cell diversity branch, the processor directs the difference detector 103 to produce a difference value D(i) between the current power level P(c) and the power level P(i) of the candidate diversity branch "i" and enables the table 302 to read differential improvement data K'(i) corresponding to the difference D(i) and current power level P(c). The differential improvement data K'(i) is summed in the adder 106 with the power level data P(i) of the intra-cell diversity branch to produce an updated power level data P(i), which is applied to the maximum detector 107.

If the candidate diversity branch is an inter-cell diversity branch, the processor 301 directly supplies the power level data P(i) of this inter-cell diversity branch to the maximum detector 107. As a result, at least one updated power level data and/or at least one non-updated power level data are produced and fed to the maximum detector 107.

When all pilot signals of the list are processed in this manner, the maximum detector 107 detects the highest value of the input signals and selects a diversity branch which corresponds to the detected highest value and informs the message sender 108 of the identity of the selected diversity branch.

Figure 8:
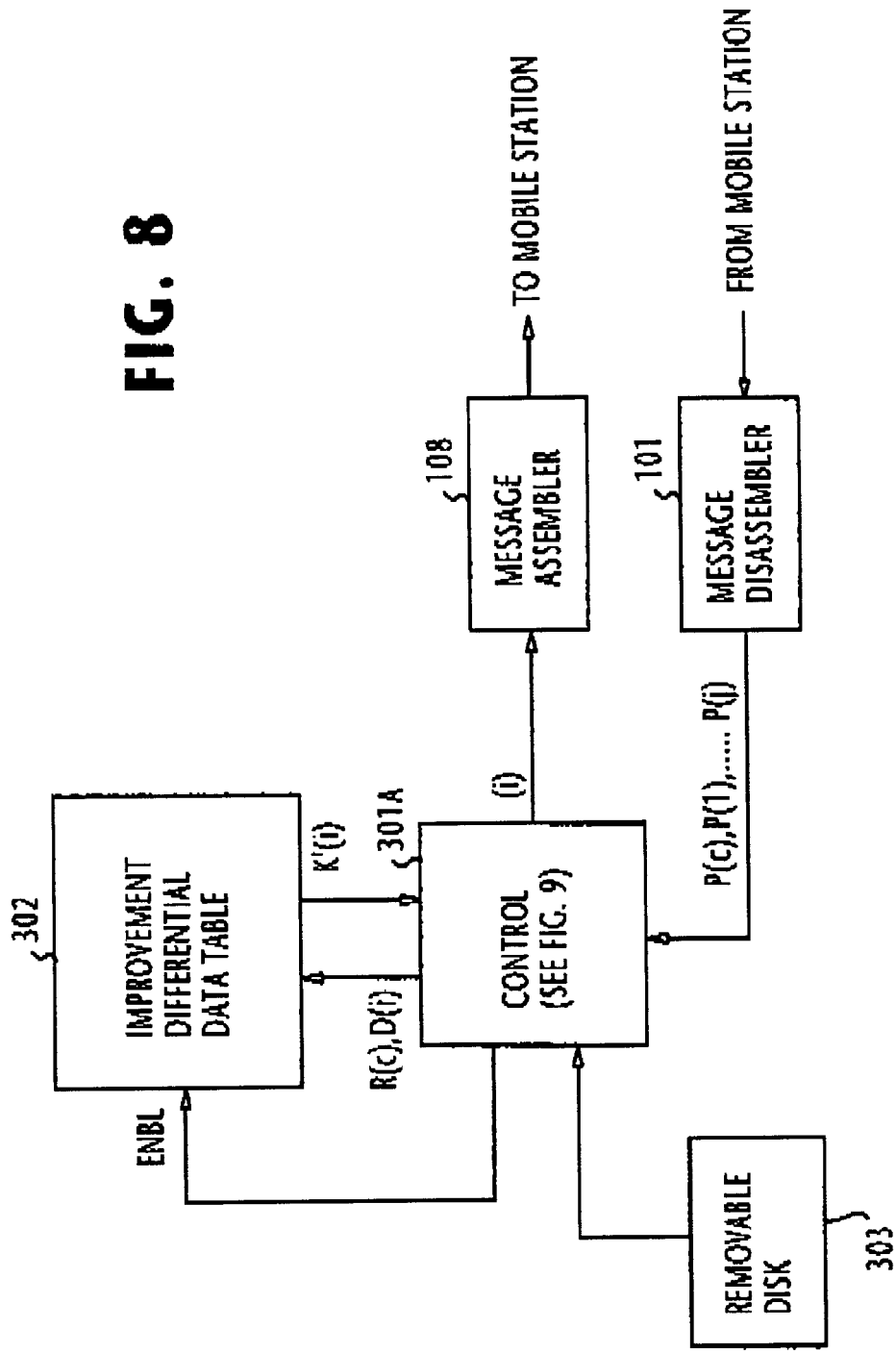
FIG. 8 is a block diagram of modified diversity handover processing circuitry of the second embodiment of the present invention.

The second embodiment of the present invention may be modified as shown in FIG. 8 in which the control processor 301A operates according to programmed instructions stored in a removable disk 303. The operation of the processor 301A is illustrated in the flowchart of FIG. 9, in which parts corresponding to those in FIG. 5 are marked with the same numerals and the description thereof is omitted.

In FIG. 9, when the processor 301A reads a pilot signal "i" from the list of pilot signals at step 203, it determines whether the diversity branch of the pilot signal is an inter-cell or an intra-cell diversity branch (step 401). If the processor has determined that the diversity branch of the pilot signal is an inter-cell diversity branch, it proceeds from step 401 to step 209. If the processor has determined that the diversity branch of the pilot signal is an intra-cell diversity branch, it proceeds to step 402 to detect the difference D(i) between the power level P(i) of the pilot signal "i" and the power level P(c) of the current pilot signal and reads a differential diversity gain K'(i) from the table 302 corresponding to the power level P(c) and the difference value D(i). The power level P(i) of the intra-cell diversity branch is updated by summing it with the diversity gain K'(i) at step 404.

The above process is repeated until the variable "i" is equal to "j" at step 209.

What is claimed is:

1. A method of selecting a diversity branch from a list of pilot signals detected by and sent from a mobile station and informing said mobile station of identity of the selected diversity branch as an additional diversity branch, said pilot signals indicating their power levels and identities of diversity branches through which the pilot signals are respectively transmitted to said mobile station, the method comprising the steps of:
   a) storing diversity gain data in a first memory which indicates an amount to be gained when maximal ratio combining is performed on signals from intra-cell diversity branches and storing diversity gain data in a second memory which indicates an amount to be gained when selective combining is performed on signals from inter-cell diversity branches;
   b) determining whether the diversity branch of each pilot signal of said list is an intra-cell diversity branch or an inter-cell diversity branch;
   c) if the diversity branch of said each pilot signal is said intra-cell diversity branch, reading a diversity gain from said first memory and summing the read gain with the power level of said each pilot signal;
   d) if the diversity branch of said each pilot signal is said inter-cell diversity branch, reading a diversity gain from said second memory and summing the read gain with the power level of said each pilot signal; and
   e) selecting one of said diversity branches of said list corresponding to the highest of sums obtained by steps (c) and (d).

2. The method of claim 1, wherein each of steps (c) and (d) reads a diversity gain from each of said first and second memories corresponding to the power level of a pilot signal received by said mobile station from a currently used diversity branch.

3. The method of claim 1, wherein each of steps (c) and (d) comprises the steps of detecting a difference between the power level of a pilot signal of said list and the power level of a pilot signal received by said mobile station from a currently used diversity branch, and reading a diversity gain from each of said first and second memories corresponding to said difference.

4. The method of claim 1, wherein each of steps (c) and (d) comprises the steps of:
   detecting a difference between the power level of each pilot signal of said list and the power level of a current pilot signal received by said mobile station from a currently used diversity branch; and
   reading a diversity gain from each of said first and second memories corresponding to the power level of said current pilot signal and said difference.

5. A method of selecting a diversity branch from a list of pilot signals detected by and sent from a mobile station and informing said mobile station of identity of the selected diversity branch as an additional diversity branch, said pilot signals indicating their power levels and identities of diversity branches through which the pilot signals are transmitted respectively to said mobile station, the method comprising the steps of:
   a) storing diversity gain data in a memory which indicates a difference between an amount to be gained when maximal ratio combining is performed on signals from intra-cell diversity branches and an amount to be gained when selective combining is performed on signals from inter-cell diversity branches;
   b) determining whether the diversity branch of each pilot signal of said list is a predetermined one of an intra-cell diversity branch and an inter-cell diversity branch;
   c) if the diversity branch of said each pilot signal is said predetermined one, reading a diversity gain from said first memory and combining the read gain with the power level of said each pilot signal to produce a sum;
   d) if the diversity branch of said each pilot signal is other than said predetermined one, identifying the power level of said each pilot signal as a non-sum; and
   e) selecting one of the diversity branches of said list corresponding to the highest of at least one sum produced by step (c) and at least one non-sum identified by step (d).

6. The method of claim 5, wherein step (c) reads a diversity gain from said memory corresponding to the power level of a pilot signal of a diversity branch currently used by said mobile station.

7. The method of claim 5, wherein step (c) comprises the steps of detecting a difference between the power level of each pilot signal of said list and the power level of a pilot signal received by said mobile station from a currently used diversity branch, and reading a diversity gain from said memory corresponding to said difference.

8. The method of claim 5, wherein step (c) comprises the steps of: comprises the steps of:

detecting a difference between the power level of each pilot signal of said list and the power level of a current pilot signal received by said mobile station from a currently used diversity branch; and reading a diversity gain from each of said first and second memories corresponding to the power level of said current pilot signal and said difference.

9. A system for selecting a diversity branch from a list of pilot signals detected by and sent from a mobile station and informing said mobile station of identity of the selected diversity branch as an additional diversity branch, the detected pilot signals indicating their power levels and identities of diversity branches through which the pilot signals are respectively transmitted to said mobile station, comprising:

a first memory for storing diversity gain data which indicates an amount to be gained when maximal ratio combining is performed on signals from intra-cell diversity branches;

a second memory for storing diversity gain data which indicates an amount to be gained when selective combining is performed on signals from inter-cell diversity branches; and control means for determining whether the diversity branch of each of said pilot signals is an intra-cell diversity branch or an inter-cell diversity branch, and reading a diversity gain from said first memory and summing the read gain with the power level of said each pilot signal if the diversity branch is determined to be said intra-cell diversity branch, or reading a diversity gain from said second memory and summing the read gain with the power level of said each pilot signal if the diversity branch is determined to be said inter-cell diversity branch, whereby a plurality of summed values are produced, and selecting one of the diversity branches of said list corresponding to the highest of said summed values.

10. The system of claim 9, wherein said control means comprises:

processing circuitry for determining whether the diversity branch of each of said pilot signals is an intra-cell diversity branch or an inter-cell diversity branch, and reading a diversity gain from said first memory if the diversity branch is determined to be said intra-cell diversity branch, or reading a diversity gain from said second memory if the diversity branch is determined to be said inter-cell diversity branch;

adder circuitry for summing each of the diversity gains read by the processing circuitry with the power level of said each pilot signal, whereby a plurality of summed values are produced from all pilot signals of said list; and selector circuitry for determining said selected diversity branch by selecting one of the diversity branches of said list having a highest value of said summed values.

11. The system of claim 9, wherein said control means reads a diversity gain from each of said first and second memories corresponding to the power level of a pilot signal received by said mobile station from a currently used diversity branch.

12. The system of claim 9, wherein said control means detects a difference between the power level of each pilot signal of said list and the power level of a pilot signal received by said mobile station from a currently used diversity branch, and reads a diversity gain from each of said first and second memories corresponding to said difference.

13. The system of claim 9, wherein said control means detects a difference between the power level of each pilot signal of said list and the power level of a current pilot signal received by said mobile station from a currently used diversity branch, and reads a diversity gain from each of said first and second memories corresponding to the power level of said current pilot signal and said difference.

14. The system of claim 10, wherein said processing circuitry reads a diversity gain from each of said first and second memories corresponding to the power level of a pilot signal received by said mobile station from a currently used diversity branch.

15. The system of claim 10, wherein said processing circuitry detects a difference between the power level of each pilot signal of said list and the power level of a pilot signal received by said mobile station from a currently used diversity branch, and reads a diversity gain from each of said first and second memories corresponding to said difference.

16. The system of claim 10, wherein said processing circuitry detects a difference between the power level of each pilot signal of said list and the power level of a current pilot signal received by said mobile station from a currently used diversity branch, and reads a diversity gain from each of said first and second memories corresponding to the power level of said current pilot signal and said difference.

17. A system for selecting a diversity branch from a list of pilot signals detected by and sent from a mobile station and informing said mobile station of identity of the selected diversity branch as an additional diversity branch, the detected pilot signals indicating their power levels and identities of diversity branches through which the pilot signals are respectively transmitted to said mobile station, comprising:

a memory for storing diversity gain data which indicates a difference between an amount to be gained when maximal ratio combining is performed on signals from intra-cell diversity branches and an amount to be gained when selective combining is performed on signals from inter-cell diversity branches;

control means for determining whether the diversity branch of each of said pilot signals is a predetermined one of an intra-cell diversity branch and an inter-cell diversity branch, reading a diversity gain from said memory, summing the read gain with the power level of said each pilot signal if the diversity branch of the pilot signal is determined to be said predetermined one to produce a sum, identifying the power level of said each pilot signal as a non-summed power level if the diversity brand of the pilot signal is determined to be other than said predetermined one, and selecting one of the diversity branches of said list corresponding to the highest of a plurality of said summed power level and a plurality of said non-summed power level.

18. The system of claim 17, wherein said control means comprises:

processing circuitry for determining whether the diversity branch of each of said pilot signals is a predetermined one of an intra-cell diversity branch and an inter-cell diversity branch, and reading a diversity gain from said first memory if the diversity branch is determined to be said predetermined one and identifying the power level of said each pilot signal as a non-sum when said diversity branch is determined to be other than said predetermined one;

adder circuitry for summing each of the diversity gains read by the processing circuitry with the power level of said each pilot signal when said diversity branch is determined to be said predetermined one to produce a sum; and selector circuitry for selecting one of the diversity branches of said list corresponding to the highest of at least one sum produced by the adder circuitry and at least one non-sum identified by the processing circuitry.

19. The system of claim 17, wherein said control means reads a diversity gain from each of said first and second memories corresponding to the power level of a pilot signal received by said mobile station from a currently used diversity branch.

20. The system of claim 17, wherein said control means detects a difference between the power level of each pilot signal of said list and the power level of a pilot signal received by said mobile station from a currently used diversity branch, and reads a diversity gain from each of said first and second memories corresponding to said difference.

21. The system of claim 17, wherein said control means detects a difference between the power level of each pilot signal of said list and the power level of a current pilot signal received by said mobile station from a currently used diversity branch, and reads a diversity gain from each of said first and second memories corresponding to the power level of said current pilot signal and said difference.

22. The system of claim 21, wherein said processing circuitry reads a diversity gain from each of said first and second memories corresponding to the power level of a pilot signal received by said mobile station from a currently used diversity branch.

23. The system of claim 21, wherein said processing circuitry detects a difference between the power level of each pilot signal of said list and the power level of a pilot signal received by said mobile station from a currently used diversity branch, and reads a diversity gain from each of said first and second memories corresponding to said difference.

24. The system of claim 21, wherein said processing circuitry detects a difference between the power level of each pilot signal of said list and the power level of a current pilot signal received by said mobile station from a currently used diversity branch, and reads a diversity gain from each of said first and second memories corresponding to the power level of said current pilot signal and said difference.

25. A computer readable storage medium for a system including a first memory storing diversity gain data which indicates an amount to be gained when maximal ratio combining is performed on signals from intra-cell diversity branches and a second memory storing diversity gain data which indicates an amount to be gained when selective combining is performed on signals from inter-cell diversity branches, said storage medium storing instructions data which comprises the steps of:

a) receiving a list of pilot signals detected by and sent from a mobile station, said pilot signals indicating their power levels and their diversity branches;

b) determining whether the diversity branch of each pilot signal of said list is an intra-cell diversity branch or an inter-cell diversity branch;

c) if the diversity branch of said each pilot signal is said intra-cell diversity branch, reading a diversity gain from said first memory and summing the read gain with the power level of said each pilot signal;

d) if the diversity branch of said each pilot signal is said inter-cell diversity branch reading a diversity gain from said second memory and summing the read gain with the power level of said each pilot signal;

e) repeating steps (b) to (d) until a plurality of summed values are produced from all pilot signals of said list; and f) selecting one of said diversity branches indicated in said list having a highest value of said summed values.

26. The computer readable storage medium of claim 25, wherein step (b) reads a diversity gain from each of said first and second memories corresponding to the power level of a pilot signal received by said mobile station from a currently used diversity branch.

27. The computer readable storage medium of claim 25, wherein step (b) comprises the steps of detecting a difference between the power level of a pilot signal of said list and the power level of a pilot signal received by said mobile station from a currently used diversity branch, and reading a diversity gain from each of said first and second memories corresponding to said difference.

28. The computer readable storage medium of claim 25, wherein step (b) comprises the steps:

detecting a difference between the power level of each pilot signal of said list and the power level of a current pilot signal received by said mobile station from a currently used diversity branch; and reading a diversity gain from each of said first and second memories corresponding to the power level of said current pilot signal and said difference.

29. A computer readable storage medium for a system including a memory storing diversity gain data which indicates a difference between an amount to be gained when maximal ratio combining is performed on signals from intra-cell diversity branches and an amount to be gained when selective combining is performed on signals from inter-cell diversity branches, said storage medium storing instructions data which comprises the steps of:

a) receiving a list of pilot signals detected by and sent from a mobile station, said pilot signals indicating their power levels and their diversity branches through which the pilot signals are detected;

b) reading a diversity gain from said memory corresponding to a pilot signal of said list and summing the read gain with the power level of the pilot signal if the diversity branch of the pilot signal is a predetermined one of said intra-cell and inter-cell diversity branches and identifying the power level of the pilot signal as a non-sum if the diversity branch of the pilot signal is other than said predetermined one;

c) repeating step (b) on all pilot signals of said list to produce at least one sum and at least one non-sum; and d) selecting one of the diversity branches of said list corresponding to the highest of sums and non-sums produced by step (c).

30. The computer readable storage medium of claim 29, wherein step (b) reads a diversity gain from said memory corresponding to the power level of a pilot signal associated with a diversity branch currently used by said mobile station.

31. The computer readable storage medium of claim 29, wherein step (b) comprises the steps of detecting a difference between the power level of a pilot signal of said list and the power level of a pilot signal received by said mobile station from a currently used diversity branch, and reading a diversity gain from said memory corresponding to said difference.

32. The computer readable storage medium of claim 29, wherein step (b) comprises the steps of:

detecting a difference between the power level of each pilot signal of said list and the power level of a current pilot signal received by said mobile station from a currently used diversity branch; and reading a diversity gain from each of said first and second memories corresponding to the power level of said current pilot signal and said difference.

* * * * *